US012615293B2

(12) United States Patent
Gowda et al.

(10) Patent No.: US 12,615,293 B2
(45) Date of Patent: Apr. 28, 2026

(54) SYSTEMS AND METHODS FOR PREVENTING PHISHING ATTACKS

(71) Applicant: Open Text Inc., Menlo Park, CA (US)

(72) Inventors: Hemanth Moganna Gowda, Bengaluru (IN); Sachin Pargi, Bangalore (IN)

(73) Assignee: OPEN TEXT INC., Menlo Park, CA (US)

( * ) Notice: Subject to any disclaimer, the term of this patent is extended or adjusted under 35 U.S.C. 154(b) by 43 days.

(21) Appl. No.: 18/891,754

(22) Filed: Sep. 20, 2024

(65) Prior Publication Data

US 2026/0089191 A1 Mar. 26, 2026

(51) Int. Cl.
*H04L 9/40* (2022.01)

(52) U.S. Cl.
CPC ................................ *H04L 63/1483* (2013.01)

(58) Field of Classification Search
CPC .................................................. H04L 63/1483
See application file for complete search history.

(56) References Cited

U.S. PATENT DOCUMENTS

| | | | | |
|---|---|---|---|---|
| 2022/0038498 | A1* | 2/2022 | Kras | H04L 63/1483 |
| 2022/0279014 | A1* | 9/2022 | Stokes, III | G06N 3/08 |
| 2023/0344868 | A1* | 10/2023 | Kaligotla | H04L 63/1483 |

* cited by examiner

*Primary Examiner* — Sm A Rahman
(74) *Attorney, Agent, or Firm* — Sprinkle IP Law Group

(57) ABSTRACT

Embodiments of the present disclosure provide systems and methods to classify webpages according to phishing risk. Embodiments combine generative AI with a knowledgebase of anti-phishing questions. To classify a webpage, the generative AI processes details from the webpage to answer the anti-phishing questions. The webpage is classified at least in part based on the results generated by the generative AI.

19 Claims, 7 Drawing Sheets

```
[{
   "basis": "url",
   "tier": 1,
   "questions": [
      {"question": "What is the schema in the url?", "jsonkey": "schema"},
      {"question": "What is the top level domain?", "jsonkey": "TLD"},
      {"question": "What is the domain?", "jsonkey": "domain"},
      {"question": "Does the url have an IP?", "jsonkey": "url has IP"},
      {"question": "What is the subdomain?", "jsonkey": "subdomain"},
      {"question": "Which unusual characters does the url contain?", "jsonkey": "unusual character list in url"},
      {"question": "Which company does the domain belong to?", "jsonkey": "domain belongs to"},
      {"question": "Can the top level domain be associated with the domain?", "jsonkey": "TLD can associate with domain"}
   ]
},
{
   "basis": "webpage content",
   "tier": 1,
   "questions": [
      {"question": "Which industry type does the webpage belong to?", "jsonkey": "industry"},
      {"question": "Which brand is it projecting?", "jsonkey": "brand"},
      {"question": "List five products being advertised?", "jsonkey": "products list"},
      {"question": "Is it asking for personal information?", "jsonkey": "asking for personal information"},
      {"question": "Is it asking user to login or sign-in?", "jsonkey": "asking to login"},
      {"question": "Is it asking for password or passcode or passphrase?", "jsonkey": "asking for password"},
      {"question": "Is it asking to enter email details?", "jsonkey": "asking for email details"},
      {"question": "Is it asking for address?", "jsonkey": "asking for address"},
      {"question": "Is it asking for any card number?", "jsonkey": "asking for card details"},
      {"question": "Is there a sense of urgency in the webpage content?", "jsonkey": "showing urgency"},
      {"question": "Is it asking the user to hurry?", "jsonkey": "asking to hurry"},
      {"question": "Is it saying that the offer is lasting for only a few days?", "jsonkey": "saying offer is expiring"},
      {"question": "How many spelling mistakes are there in the webpage?", "jsonkey": "number of spelling mistakes"},
      {"question": "What ratio of links are to external domains?", "jsonkey": "ratio of external links"}
   ]
}]
```

```
instruction = (f"In the below text between {TemplateBuilder.seps['context'][0]},
replace any 'hgolb:' with an opening curly bracket and any ':hgorb' with a
closing curly bracket. " +
               f"Based on the {basis} given below between
{TemplateBuilder.seps['context'][0]}, provide answers to questions in JSON format
with keys mentioned between {TemplateBuilder.seps['jsonkeys'][0]}."

n_orig_context = len(context.split())
context = "{0}{1}{2}".format(TemplateBuilder.seps['context'][1], context,
TemplateBuilder.seps['context'][1])
questions = "{0}{1}{2}".format(TemplateBuilder.seps['questions'][1],
"{questions}", TemplateBuilder.seps['questions'][1])
keys = "{0}{1}{2}".format(TemplateBuilder.seps['jsonkeys'][1], jks,
TemplateBuilder.seps['jsonkeys'][1])
template = instruction + context + questions + keys

n_tokens = {"instruction": len(instruction.split()), "original context":
n_orig_context, "questions": len(qs.split()), "keys": len(keys.split())}
```

FIG. 3

BLOCK

Could not find webpage URL in internet
search for products/services in domain.

Sense of urgency in soliciting user.

Found misspellings.

Page has several unusual characters.

---

PASSED

Found webpage URL in internet search for
products/services in domain.

Found copyright logo.

Not asking for personally identifiable
information.

---

Suspicious

Could not find webpage URL in internet
search for products/services in domain.

Asking for telephone number and email.

No sense of urgency.

Consistent Branding ( Continue )          ( Block )

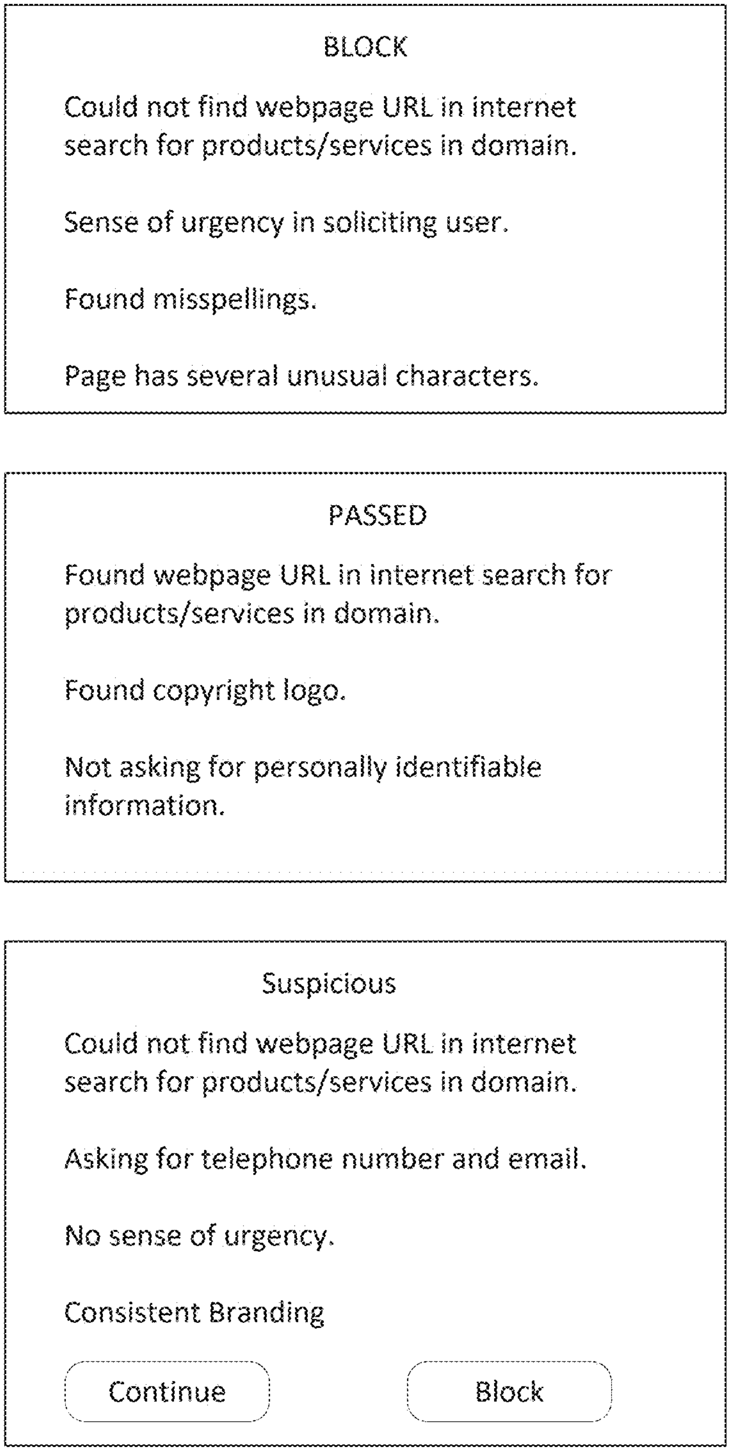

Start

702 — Receive Request to Classify Webpage

703 — Extract Contexts

704 — Access Instruction Definition

706 — Generate Instruction to AI According to Instruction Definition

708 — Input Instruction to AI

710 — Receive Initial AI Result

712 — Build Search Query

714 — Execute Search

716 — Process Search Result to Enhance Initial Result

718 — Classify Webpage Based on Results

720 — Generate and Return Response

End

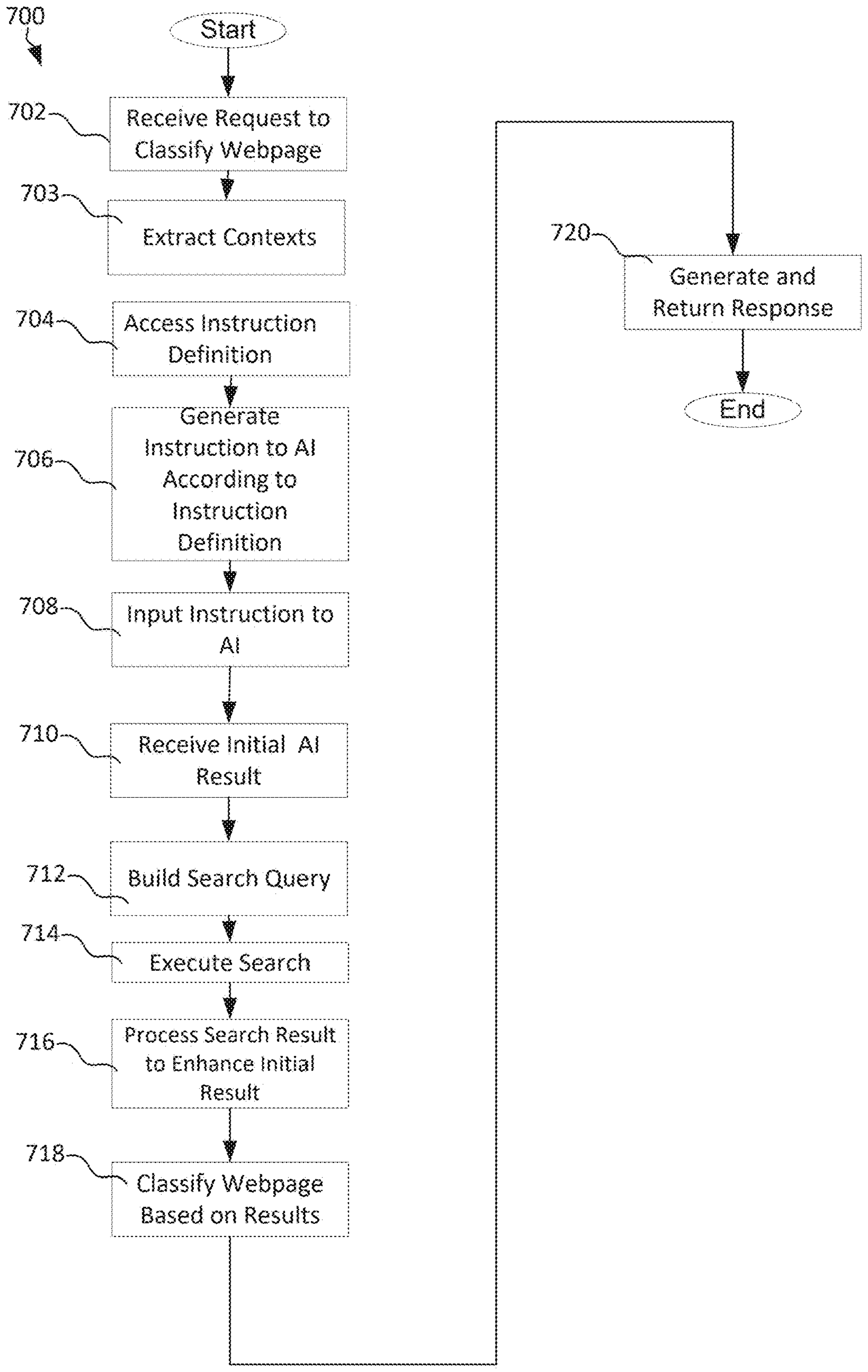

FIG. 7

SYSTEMS AND METHODS FOR PREVENTING PHISHING ATTACKS

TECHNICAL FIELD

Embodiments of the present disclosure relate to preventing phishing attacks.

BACKGROUND

Phishing is a type of cyberattack that attempts to trick people into divulging personal information such as usernames, passwords, credit card numbers, bank account information. Phishing attacks typically use legitimate looking webpages to steal information from unsuspecting individuals.

Cybersecurity systems use discriminative models to identify malignant activity such as phishing. A model's determination of malignant activity may be characterized as one of:

- a true positive: phishing/malignant activity recognized as such;
- a true negative: benign activity recognized as such (e.g., not recognized as phishing/malignant activity);
- a false positive (type I error): benign activity misrecognized as phishing/malicious activity;
- a false negative (type II error): phishing/malicious activity not recognized as phishing/malignant activity.

Discriminative models in a non-deterministic system apply a hard margin that represents a trade-off between false negatives and false positives. The margin between the cost of false negatives and the cost of false positives is very thin. On occasions, a malicious activity unstopped causes significant damage and on other occasions, blocking access to benign activity can either cause a drastic loss of trust in the cybersecurity product or incurs high cost of investigating the false positives. Because phishing attacks represent a very small amount of traffic among a large volume of benign activity traffic, it is challenging to determine the margin between the cost of false negatives and the cost of false positives.

Moreover, because malignant activities over the internet have a very short shelf-life, the hard margins applied by discriminative models only remain accurate for a short period of time. Consequently, the discriminative model must be retrained, which can be a time and data intensive process.

Further, the discriminative models used in cybersecurity products work passively and communicate their decisions to the user. A lack of user feedback to a decision is implicitly treated as a discriminative, binary feedback from the user—the decision was "completely useful" or "completely useless". Thus, the feedback has limited usefulness in learning the hard margins.

SUMMARY

Embodiments of the present disclosure provide systems and methods for preventing phishing attacks. According to one embodiment, client devices include browser plug-ins that collect webpage details of the webpages requested by users. The browser plug-ins send the webpage details to a cybersecurity agent for analysis. The cybersecurity agent, according to one embodiment, runs on a server. The cybersecurity agent includes an AI model that comprises a trained large language model (LLM) and is equipped with tools and a knowledgebase. The knowledgebase comprises a human expert (cybersecurity) questionnaire in natural language. The cybersecurity agent can serve as an assistant to objectively assess the webpages requested by each of the users for phishing. By inferring the answers to the expert questions from the webpage content, the cybersecurity agent can proceed to advise the user with the necessary levels of caution. In some embodiments, the users are presented with notifications of the risk level. In some embodiments, the notification is color coded based on the risk level. The notification may include reasons supporting the level of risk assigned to a web page.

One general aspect of the present disclosure includes a computer-implemented method for preventing phishing. The computer-implemented method includes receiving a request to classify a webpage requested by a web browser. The request to classify the webpage may include details of the webpage. The computer-implemented method may further include classifying the webpage using the details of the webpage and returning a response to the request to classify the webpage, where the response includes a phishing classification. Classifying the webpage may include: accessing an instruction definition from a memory, the instruction definition specifying anti-phishing questions for phishing detection and an answer format for the anti-phishing questions; generating, according to the instruction definition, a programmatic instruction to an artificial intelligence (AI) model, such as a large language model, to prompt the AI model to answer the anti-phishing questions using the details of the webpage, the programmatic instruction may include the anti-phishing questions, the answer format, and the details of the webpage. Classifying the webpage may further comprise receiving a result of processing the programmatic instruction from the AI model. The result may include a plurality of answers, including answers to the anti-phishing questions. Classifying the webpage may further comprise determining a phishing classification from a plurality of potential classifications based on the result. Other embodiments can include a non-transitory, computer-readable medium storing thereon instructions to cause a processor to implement the method.

Implementations may include one or more of the following non-limiting example features. The response is returned prior to the web browser rendering the webpage. A message is displayed to a user of the web browser, the message indicating the phishing classification. The response includes a reason for the phishing classification and where the message includes the reason. A defined action may be executed based on the phishing classification. The defined action may include allowing the webpage, blocking the webpage, displaying the message, or another defined action. The details of the webpage may include a uniform resource locator of the webpage and content text of the webpage. The instruction definition, according to one embodiment, associates the anti-phishing questions specified in the instruction definition with contexts selected from the details of the webpage. The programmatic instruction may specify which context is to be used for answering each of the anti-phishing questions specified in the instruction definition. The phishing classification may be determined based on an enhanced result. Determining the phishing classification based on the result may include scoring the result to generate a score, where the phishing classification is selected based on the score. Implementations of the described techniques may include hardware, a method or process, or computer software on a computer-accessible medium.

Another general aspect of the present disclosure includes an anti-phishing system. The anti-phishing system of one embodiment comprises a client computer that includes a web browser and a browser plug-in. The browser plug-in comprises instructions executable for capturing details of a webpage requested by the web browser, generating a request to classify the webpage, receiving a response to the request to classify the webpage, and executing a predefined action based on the response. In one embodiment, the request to classify the webpage includes the details of the webpage and the response comprises the phishing classification.

The anti-phishing system of one embodiment further includes a server computer in communication with the client computer over a network. The server computer comprises a cybersecurity agent that includes an AI model. cybersecurity agent may further comprise instructions executable for maintaining an anti-phishing knowledgebase, classifying the webpage using the details of the webpage to determine the phishing classification, and returning a response to the client computer, the response including the phishing classification.

Classifying the webpage may include accessing an instruction definition that specifies anti-phishing questions for phishing detection from the anti-phishing knowledgebase and an answer format for the anti-phishing questions and generating, according to the instruction definition, a programmatic instruction to the AI model to prompt the AI model to answer the anti-phishing questions using the details of the webpage. The programmatic instruction may comprise the anti-phishing questions specified by the instruction definition, the answer format, and the details of the webpage.

Classifying the webpage may include receiving a result of processing the programmatic instruction from the AI model, the result comprising a plurality of answers, the plurality of answers comprising answers to the anti-phishing questions included in the programmatic instruction to the AI model. Classifying the webpage may include determining the phishing classification based on the result.

Implementations may include one or more of the following non-limiting example features. The response is returned prior to the web browser rendering the webpage. The browser plug-in includes instructions executable to display a message to a user of the web browser, the message indicating the phishing classification. The response includes a reason for the phishing classification and the message includes the reason. The browser plug-in includes instructions executable to execute a predefined action based on the phishing classification. The predefined action may include allowing the webpage, blocking the webpage, displaying the message, or another defined action. The details of the webpage may include a uniform resource locator of the webpage and content text of the webpage. The instruction definition, according to one embodiment, associates the anti-phishing questions specified in the instruction definition with contexts selected from the details of the webpage. The programmatic instruction may specify which context is to be used for answering each of the anti-phishing questions specified in the instruction definition. The AI model may be executable to generate an initial result using the AI model, the initial result comprising the answers to the anti-phishing questions. The cybersecurity agent may include instructions executable to generate a search query to a search engine, where the search query incorporates the answer to at least one of the anti-phishing questions. The cybersecurity agent may include instructions that are executable to receive a search result from the search engine responsive to the search query. The cybersecurity agent may include instructions executable to enhance the initial result using the search result to generate an enhanced result. The phishing classification may be determined based on the enhanced result.

Embodiments use generative AI to answer anti-phishing questions that are engineered to detect indications of phishing detection questions. Humans are often better than models at identifying new forms of deception. Thus, embodiments can provide an advantage by combining a generative AI model's breadth of knowledge and tirelessness with human ingenuity and acuity to identify deceptions. Moreover, the anti-phishing questions can be engineered to be applicable to a wide range of phishing attacks. Thus, embodiments can eliminate or reduce the need for rules hardcoded for specific attacks or hard margins determined from prior known attacks.

Further, the use of an expert knowledgebase to prompt the AI model allows embodiments to be efficiently updated. For example, the rapidly evolving techniques used in phishing attacks can be combated by updating the knowledgebase with new questions. Thus, the need to retrain the model for new phishing techniques is reduced or eliminated.

Some embodiments of the present disclosure allow users to actively update the anti-phishing question knowledgebase used by the generative AI. Thus, embodiments of the present disclosure provide an advantage by allowing the phishing detection to be updated with expertise from a wide variety of sources without having to wait for the model to be retrained using feedback to prior decisions by the model.

Some embodiments of the present disclosure implement focused Internet searches to enhance the results provided by the generative AI. The use of focused searches can provide an advantage by reducing false positives.

Some embodiments of the present disclosure provide phishing classification with reasons for the phishing classification. This can allow the end user who has the most knowledge about the interaction with the Internet to balance the costs of accepting a webpage versus the costs of rejecting the webpage.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 2 illustrates an example embodiment of an anti-phishing knowledgebase.

FIG. 3 illustrates an example embodiment of instruction builder instructions.

FIG. 4 illustrates example embodiments of messages generated based on an anti-phishing response.

FIG. 7 is a flow chart illustrating one embodiment of a method of processing a request to return a phishing classification.

WRITTEN DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments of the present disclosure provide systems and methods to classify webpages according to phishing risk. Embodiments combine generative AI with a knowledgebase of anti-phishing questions. To classify a webpage, the generative AI processes details from the webpage to answer the anti-phishing questions. The webpage is classified at least in part based on the results generated by the generative AI. In some embodiments, focused Internet searches are conducted based on the results generated by the generative AI and the search results are used to enhance the results of the generative AI. Various actions may be taken based on the phishing classification, such as allowing the webpage or blocking the webpage. In some embodiments, the reasons supporting the phishing classification are displayed to user 101.

Figure 1:
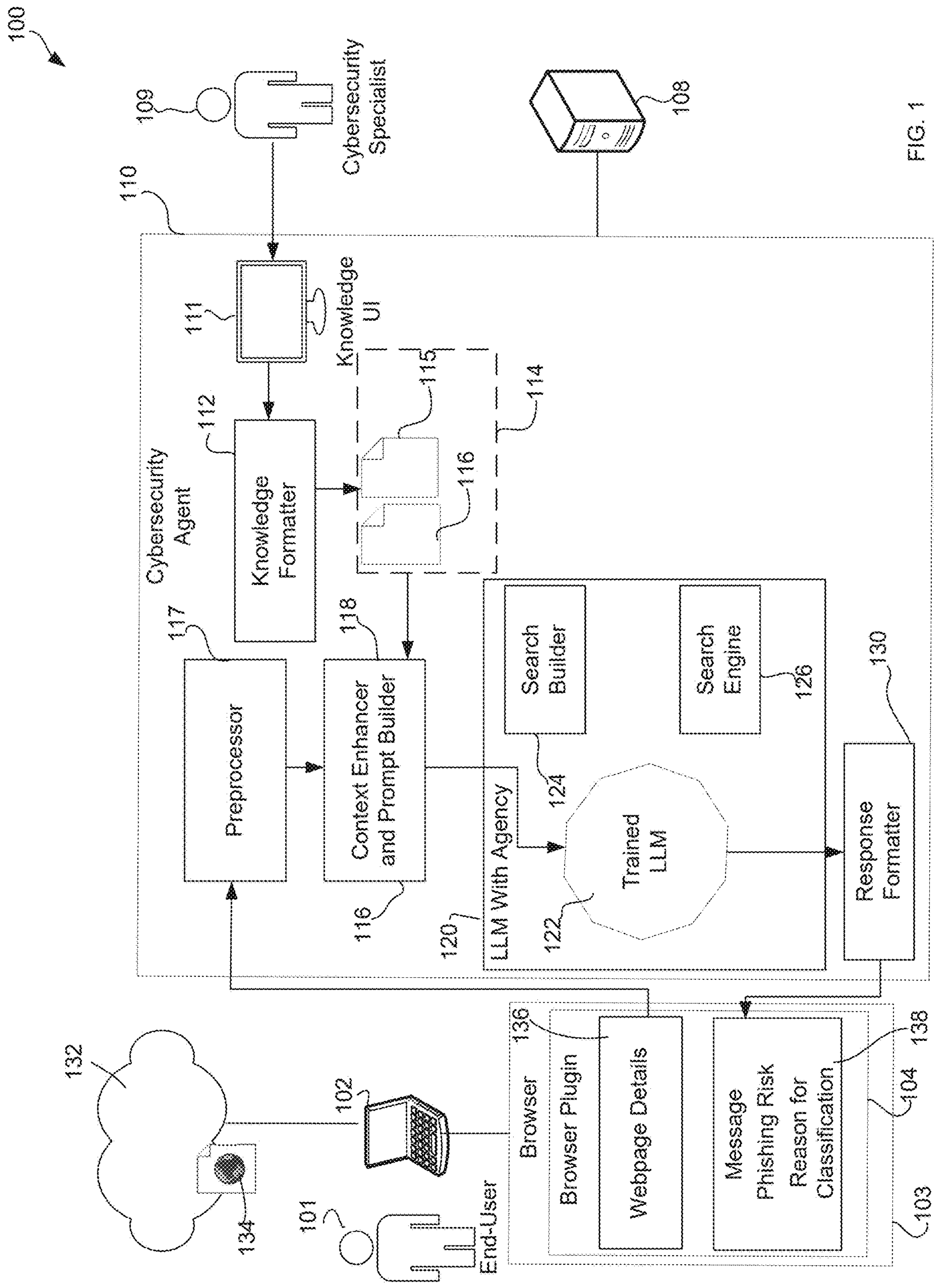
FIG. 1 is a diagrammatic representation of one embodiment of a network environment that includes one embodiment of an anti-phishing system.

FIG. 1 is a diagrammatic representation of one embodiment of a network environment 100 that includes one embodiment of an anti-phishing system. In network environment 100, a client computer 102 connected to the Internet 132. Client computer 102 comprises a web browser 103 with an anti-phishing browser plug-in 104 installed. Client computer 102 is coupled by a network (e.g., LAN, Internet) to a server computer 108 that runs a cybersecurity agent 110. While illustrated as being on different systems, browser plug-in 104 and cybersecurity agent 110 may execute on the same computer.

Cybersecurity agent 110 includes an AI model with agency employs a trained artificial intelligence (AI) model with agency 120 to detect phishing attempts. AI model with agency 120 includes a trained large language model (LLM) 122 and is equipped with tools and a knowledgebase 115. According to one embodiment knowledgebase 115 comprises a human expert (cybersecurity) questionnaire in natural language. Cybersecurity agent 110 serves as an assistant to objectively assess webpages for phishing. By inferring the answers to the expert questions from the webpage content, cybersecurity agent 110 can proceed to advise user 101 with the necessary levels of caution. User 101 is presented with a message 138 specifying the level of risk of a phishing attack. In some embodiments, the message 138 is color coded based on the risk level. Message 138 may include reasons supporting the level of risk assigned to a web page. While only one user is shown in FIG. 1, cybersecurity agent may assess the level of risk for any number of users.

Browser plug-in 104 can employ various techniques known or developed in the art to intercept, modify or block webpages. In one embodiment, browser plug-in 104 monitors a web request application programming interface (API) to intercept HTTP/HTTPS responses. In some embodiments, browser plug-in 104 runs as a background script that monitors web browser 103 for page loads and intercepts the webpage being loaded.

Thus, when web browser 103 receives a webpage 134, browser plug-in 104 intercepts webpage 134, collects webpage details for webpage 134 and provides the webpage details to cybersecurity agent 110 for analysis. Examples of webpage details include, but are not limited to, the URL of webpage 134, the webpage content text from webpage 134, and images from webpage 134. Cybersecurity agent 110 employes a trained artificial intelligence (AI) model with agency 120 to detect phishing attempts using prompt engineering techniques.

Cybersecurity agent 110 returns a response to browser plug-in 104. The response includes a phishing classification indicating a risk that webpage 134 represents a phishing attack. Browser-plug-in 104 executes one or more predefined actions based on the response from cybersecurity agent 110. In some embodiments, browser plug-in 104 implements actions through techniques, such as, but not limited to, content script injection and document object model (DOM) manipulation.

Examples of actions include, but are not limited to, allowing the browser to load the webpage, displaying a message to user 101 of web browser 103, or blocking the web page (e.g., blocking the web browser from loading the web page, blocking the browser from rendering the webpage). The action executed by browser plug-in 104 may depend on the phishing classification. For example, if the phishing classification indicates a low risk of a phishing attack, browser plug-in 104 may allow web browser 103 to continue loading the webpage, whereas if the phishing classification indicates a high risk of a phishing attack, browser plug-in 104 may block webpage 134. According to one embodiment, browser plug-in 104 blocks webpage 134 at least temporarily and displays message 138 to user 101. Browser plug-in 104 may provide the user with the option of continuing to load webpage 134 or to block loading of webpage 134. In some embodiments, browser plug-in 104 displays the message 138 even when the predicted risk of a phishing attack is low.

Cybersecurity agent 110 comprises knowledge user interface (UI) 111, a knowledge formatter 112, an instruction definition 114, a preprocessor 117, a context enhancer and prompt builder 118, a trained AI model with agency 120 and a response formatter 130. AI model with agency 120 comprises trained AI models capable of analyzing one or more types of content and with the ability to interface with other tools and undertake actions with respect to those tools in response to prompts. In the embodiment of FIG. 1, AI model with agency 120 comprises a trained AI model 122 that interfaces with search builder 124 and a search engine 126. In one embodiment trained AI model is a trained large language model (LLM).

Preprocessor 117 receives webpage details 136 from browser plug-in and parses the webpage details into several categories. In one embodiment, preprocessor assigns the text of the URL to a URL category (referred to as a "URL basis" below) and the webpage content text to a webpage content category (referred to as a "webpage content" basis below). As another example, preprocessor 117 may process images in a webpage and assign text associated with the images to categories (e.g., "image alt text," "image extracted text"). Preprocessor 117 passes the categorized details as context for context enhancer and prompt builder 118. More particularly, preprocessor 117 passes the text strings as context for the bases (e.g., passes the URL text string as the context for the URL basis, the web content text string as the context string for the webpage content basis, and so on).

Context enhancer and prompt builder 118 processes an instruction definition 114 to generate programmatic instructions to trained AI model 122 to prompt AI model 122 to answer anti-phishing questions using the contexts. Instruction definition 114 comprises anti-phishing knowledgebase 115 and prompt builder instructions 116. Anti-phishing knowledgebase 115, according to one embodiment, is an updated state-of-the-art verification security checklist or other dataset that comprises questions engineered by cybersecurity experts to prompt trained AI model 122 to profile webpages for phishing risk.

Anti-phishing knowledgebase 115 can be updated by cybersecurity experts based on research papers, surveys, trends, and expert knowledge. The questions in anti-phishing knowledgebase 115 may be categorized according to the basis to which they apply. Cybersecurity agent 110 includes knowledge UI 111 to allow a user (e.g., cybersecurity expert 109) to input questions and instruction definitions. Knowledge formatter 112 assists in building questions and instruction definitions. Knowledge formatter 112 provides wizards, forms or other tools to assist cybersecurity expert 109 in inputting questions and instruction definitions.

One example of an anti-phishing knowledgebase 115 is illustrated in FIG. 2. Here, anti-phishing knowledgebase 200 comprises expert questions for phishing detection organized by the basis (context) to which they apply. Questions 202, for example, are to be answered by AI model 122 using the context provided for the URL basis and questions 206 are to be answered by AI model 122 using the context provided for the webpage content basis. Further, in the embodiment of FIG. 2, anti-phishing knowledgebase 115 specifies JSON keys for storing the answers to the questions. Knowledgebase 115 has a structured format that context enhancer and prompt builder 118 is configured to parse to extract questions and associated answer JSON keys for the bases.

Returning to FIG. 1, context enhancer and prompt builder 118 executes prompt builder instructions 116 to generate a programmatic instruction to AI model 122 to answer the expert anti-phishing questions from knowledgebase 115. One embodiment of prompt builder instructions 116 is illustrated in FIG. 3 as prompt builder instructions 300. Context enhancer and prompt builder 118 processes prompt builder instructions 300 to build a final template, which is a formatted instruction for processing text and answering questions.

According to prompt builder instructions 300, an "instruction" variable is built using formatted strings ('f" . . . "') to include specific delimiters and replace certain substrings with braces. Prompt builder instructions 300 instruct that within the context text, any occurrence of 'hgolb:' should be replaced with '{' and any ':hgorb' should be replaced with '}'. According to one embodiment, the text section corresponds to the URL or content text of a webpage. Prompt builder instructions 300 further specify that answers to questions should be provided in JSON format, with keys mentioned within specific delimiters.

Prompt builder instructions 300 specify a content preparation in which 'context' is modified by wrapping it with delimiters defined in 'TemplateBuilder.seps['context'][1]'. Similarly, prompt builder instructions 300 specify question and key preparation in which 'questions' and 'keys' are prepared by wrapping them with delimiters defined in 'TemplateBuilder.seps['questions'][1]' and 'TemplateBuilder.seps['jsonkeys'][1]', respectively. A final 'template" is created by concatenating the 'instruction', 'context', 'questions', and 'keys'. 'n_orig_context' calculates the number of words in the original 'context' string. 'n_tokens' is a dictionary that stores the number of words in the 'instruction', original context, 'questions', and 'keys'.

Context enhancer and prompt builder 118 is configured with a template.seps that indicates delimiters for 'context', 'questions', and 'keys'. For example, context enhancer and prompt builder 118 may be configured with a TemplateBuilder.seps that specifies: 'context': ['<context>', '</context>'], 'questions': ['<q>', '</q>'], 'jsonkeys': ['<jkey>', '</jkey>']. In this example, context enhancer and prompt builder 118 wraps context strings with <context>, </context> delimiters, questions from knowledgebase 115 with <q>, </q> delimiters and the JSON keys from knowledgebase 115 with <jkey>, </jkey> delimiters.

For a given basis, context enhancer and prompt builder 118 builds a template:

"In the below text between <context>, replace any 'hgolb:' with an opening curly bracket and any ':hgorb' with a closing curly bracket. Based on the context given below between <context>, provide answers to questions in JSON format with keys mentioned between <jkey>. <context>{context string}</context><q>{questions}</q><jkey>{jks}</key>"

where {context string} is the context provided by preprocessor 117 for the basis (e.g., the URL text for the 'URL' basis, webpage content text for the 'webpage content' basis, etc.), {questions} is the list of question specified by anti-phishing knowledgebase 115 for the basis (e.g., questions 202 for the URL basis, questions 206 for the webpage content basis) and {jks} is the list of JSON keys for {questions} (e.g., the JSON keys specified for questions 202 for the URL basis, JSON keys specified for questions 206 for the webpage content basis).

According to one embodiment, the final template for a webpage can include a template for each basis/context provided by preprocessor 117.

Context enhancer and prompt builder 118 passes programmatic instructions to AI model 122 (e.g., a final template), which processes the template to generate answers to the questions and output the answers in a defined format (e.g., using the JSON keys). In some embodiments, AI model 122 is a multi-modal language model that is capable of performing OCR. Thus, in some embodiments, the context may include images or AI model 122 may retrieve images referenced in the webpage content, OCR the images, and use the OCR text to answer the questions. In other embodiments, OCR may be performed upstream, such as at preprocessor 117.

AI model 122 passes the answers to search builder 124, which is configured to build phishing detection search queries from the answers. Phishing detection search queries are search queries engineered to detect indicators of phishing or the absence of phishing. Search builder 124 submits the phishing detection search queries to search engine 126 to execute a phishing detection search. The results of analyzing the phishing detection searches can be added to the results from AI model 122.

In one embodiment, search builder 124 collects the multi-level domain and products/services returned by AI model 122 and builds a search query for those products/services in the domain. For example, search builder 124 may be configured with a template prompt of "site:'domain' & (product lists [0] OR product lists [1] OR product lists [2])" where 'domain' is the value provided by AI model 122 in the 'domain' JSON key and the product list values are the products contained in "product lists" populated by AI model 122 answering questions 206. Search builder 124 provides the prompt to search engine 126 which executes the phishing detection search to return a search result. Cybersecurity agent 110 parses the URLs returned in the search results to determine if the URL of webpage 134 received by browser 103 is in the top n results, where n is a configurable number.

The outputs generated by AI model 122 and search engine 126 for webpage 134 are passed to response formatter 130 which classifies webpages with a phishing classification that corresponds to a predicted risk that the webpage represents a phishing attempt (e.g., low risk, medium risk, high risk). Response formatter 130, according to one embodiment, determines a phishing risk score for the set of answers determined for webpage 134 and classifies webpage 134 based on the score. In one embodiment, for example, response formatter 130 counts the number of answers that indicate a possible phishing attempt and classifies webpage 134 based on the number of answers that indicate a possible phishing attempt. In another embodiment, response formatter 130 is configured with weights for answers and determines a weighted phishing risk score. In another example embodiment, response formatter 130 comprises a trained machine learning model that is trained to classify webpages according to phishing risk based on the answers to the questions in knowledgebase 115 and the questions answered from the results provided by search engine 126.

In some embodiments, response formatter 130 is also configured with rules to output the reasons for a phishing classification (for example, the answers that indicate a possible phishing attempt).

Further, while embodiments are described primarily in the context of processing text, AI model with agency 120 can include AI models capable of analyzing image information to answer questions. For example, an AI model can analyze images in webpage 134 to determine whether images in webpage 134 have the same resolution as used on a brand's website.

FIG. 4 illustrates some example messages with reasons and associated actions. In the example of FIG. 4, browser plug-in 104 automatically blocks webpages that represent a high risk of phishing, automatically allows browser 103 to load webpages that represent a low risk of phishing and asks for the user to decide for pages that represent a medium risk of phishing.

Figure 5:
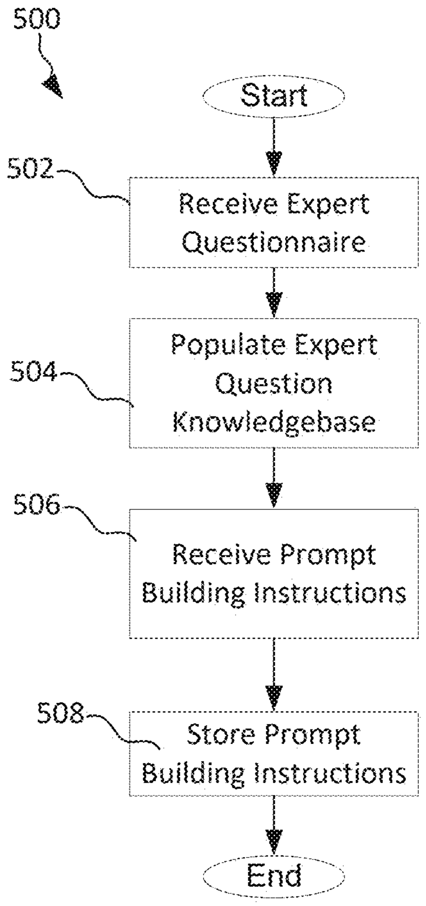
FIG. 5 is a flowchart illustrating one embodiment of configuring a cybersecurity agent with anti-phishing data.

FIG. 5 is a flowchart illustrating one embodiment of a method 500 for configuring a cybersecurity agent for phishing detection. Method 500 may be embodied, in one embodiment, as computer-executable code embodied on a non-transitory, computer-readable medium.

At step 502, cybersecurity agent 110 receives expert anti-phishing questions. The anti-phishing questions engineered by cybersecurity experts to prompt trained AI model 122 to profile webpages for phishing risk. In some embodiments, cybersecurity agent 110 provides wizards or the like to aid the user in properly formatting the request. In one embodiment, each question is associated with a basis (e.g., an indication of the portion of the webpage that is to be used to answer the question) and a key for storing the answer to the question generated by generative AI. At step 504, cybersecurity agent stores the anti-phishing questions to an anti-phishing knowledgebase (e.g., anti-phishing knowledgebase 115).

At step 506, cybersecurity agent 110 is configured with prompt building instructions. Prompt building instructions provide instructions to cybersecurity agent 110 for generating programmatic instructions to the generative AI to answer questions from knowledgebase 115. At step 508, the prompt building instructions are stored for use by cybersecurity agent 110.

FIG. 5 is merely illustrative and the disclosed subject matter is not limited to the ordering or number of steps illustrated. Embodiments may implement additional steps or alternative steps, omit steps, or repeat steps. For example, steps may be repeated for each question in the evaluation form.

Figure 6:
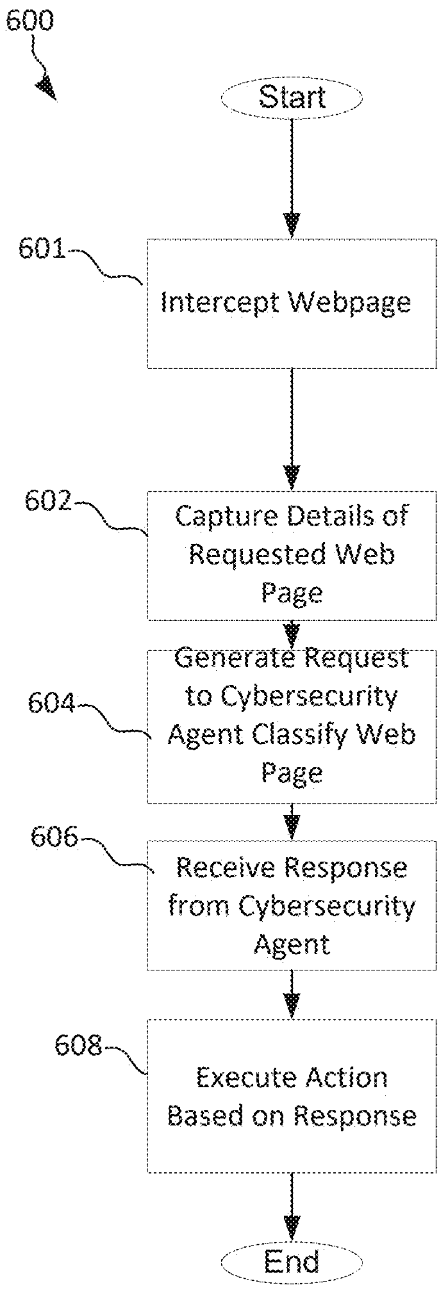
FIG. 6 is a flow chart illustrating one embodiment of a client-side anti-phishing method.

FIG. 6 is a flowchart illustrating one embodiment of a method 600 for requesting and processing a phishing classification for a webpage. Method 600 may be embodied, in one embodiment, as computer-executable code embodied on a non-transitory, computer-readable medium. In one embodiment, method 600 is implemented by a browser plug-in, such as browser-plug in 104.

At step 601, a webpage is intercepted. For example, browser plug-in 104 intercepts webpage 134 returned to web browser 103. Further, at step 602, the details of the webpage, such as the URL, the webpage content text, or images are collected. For example, browser plug-in 104 collects the details of webpage 134. At step 604, a request to classify the webpage is sent to a cybersecurity agent. The request includes the webpage details. For example, browser plug-in 104 sends a request to cybersecurity agent 110 that includes the details of webpage 134. At step 606, a response to the request is received. The response includes a phishing classification for the webpage. For example, browser plug-in 104 receives a response that includes a phishing classification for webpage 134. The response may also include reasons for the phishing classification.

At step 608, an action is executed based on the responses. In some embodiments, the action depends on the phishing classification. Examples of actions include but are not limited to, allowing the browser to load the webpage, displaying a message to a user of the web browser, or blocking the web page (e.g., blocking the web browser from loading the web page, blocking the browser from rendering the webpage). The action executed by browser plug-in 104 may depend on the phishing classification. For example, browser plug-in 104 may allow webpage 134, block webpage 134, or display a message to the user that includes the phishing classification predicted for webpage 134.

According to one embodiment, the browser plug-in at least temporarily blocks the web page and displays a message to the user with options for the user to continue loading the webpage or cancel loading of the webpage.

FIG. 6 is merely illustrative and the disclosed subject matter is not limited to the ordering or number of steps illustrated. Embodiments may implement additional steps or alternative steps, omit steps, or repeat steps. For example, steps may be repeated for each webpage received by a web browser.

FIG. 7 is a flowchart illustrating one embodiment of a method 700 for determining a phishing classification for a webpage. Method 700 may be embodied, in one embodiment, as computer-executable code embodied on a non-transitory, computer-readable medium. In one embodiment, method 700 is implemented by a cybersecurity agent, such as cybersecurity agent 110.

At step 702, a request to classify a webpage based on phishing risk is received. The request includes webpage details. For example, cybersecurity agent 110 receives a request to classify webpage 134 from browser plug-in 104 where the request includes webpage details 136. At step 703, the webpage details are parsed to extract contexts. For example, preprocessor 117 of one embodiment, extracts URL text as a first context and webpage content text as a second context.

At step 704, an instruction definition is accessed. At step 706, the instruction definition is processed to generate a programmatic instruction to AI to answer anti-phishing questions with respect to the contexts. For example, context enhancer and prompt builder 118 accesses anti-phishing knowledgebase 115 and prompt builder instructions 116 and generates a final template that includes templates for the contexts. The final template is a formatted instruction for processing text and answering questions.

At step 708, the instruction is input to an AI model. For example, cybersecurity agent 110 inputs the instruction generated by context enhancer and prompt builder 118 to AI model with agency 120 with agency and more particularly to trained AI model 122. In an even more particular embodiment, cybersecurity agent 110 inputs the instruction generated by context enhancer and prompt builder 118 to a trained LLM.

At step 710, the trained AI model generates a result responsive to the input. For example, trained AI model 122 generates a result responsive to the input. In one embodiment, the initial result includes answers to anti-phishing questions where the answers were generated by trained AI model 122.

At step 712, the initial result is used to build a search query. For example, search builder 124 builds a search query from the initial result provided by trained AI model 122. In some embodiments, building a search comprises populating a template query with answers from the initial result.

In one embodiment, search builder 124 collects the multi-level domain and products/services returned by AI model 122 and builds a search query to search for those products/services in the domain.

At step 714, a search is executed according to the search query. For example, cybersecurity agent 110 inputs the search query generated by search builder 124 to search engine 126 to cause search engine 126 to execute a corresponding search and return a search result.

At step 716, the search result is analyzed to enhance the initial result from the AI model. In one embodiment, the search result is analyzed to answer additional anti-phishing questions. For example, cybersecurity agent 110 analyzes the search result from search engine 126 to answer additional anti-phishing questions such as whether the URL of webpage 134 is in the top n results returned by search engine 126.

At step 718, the webpage is classified based on the results from the AI model and, in some embodiments, the search result from a search engine. For example, response formatter 130, according to one embodiment, determines a phishing risk score for the set of answers determined for webpage 134 and classifies webpage 134 based on the score. In one embodiment, for example, response formatter 130 counts the number of answers that indicate a possible phishing attempt and classifies webpage 134 based on the number of answers that indicate a possible phishing attempt. In another embodiment, response formatter 130 is configured with weights for answers and determines a weighted phishing risk score. In another example embodiment, response formatter 130 comprises a trained machine learning model that is trained to classify webpages according to phishing risk based on the answers to the questions in knowledgebase 115 and the questions answered from the results provided by search engine 126.

At step 720, a response to the request to classify the web page is sent to the requester, where the response includes an anti-phishing classification that indicates a predicted risk of phishing represented by the webpage. For example, cybersecurity agent 110 returns a response to browser plug-in 104 with a phishing classification for webpage 134. In some embodiments, the response includes the reasons for the phishing classification.

FIG. 7 is merely illustrative and the disclosed subject matter is not limited to the ordering or number of steps illustrated. Embodiments may implement additional steps or alternative steps, omit steps, or repeat steps. For example, steps may be repeated for each request for a phishing classification.

Figure 8:
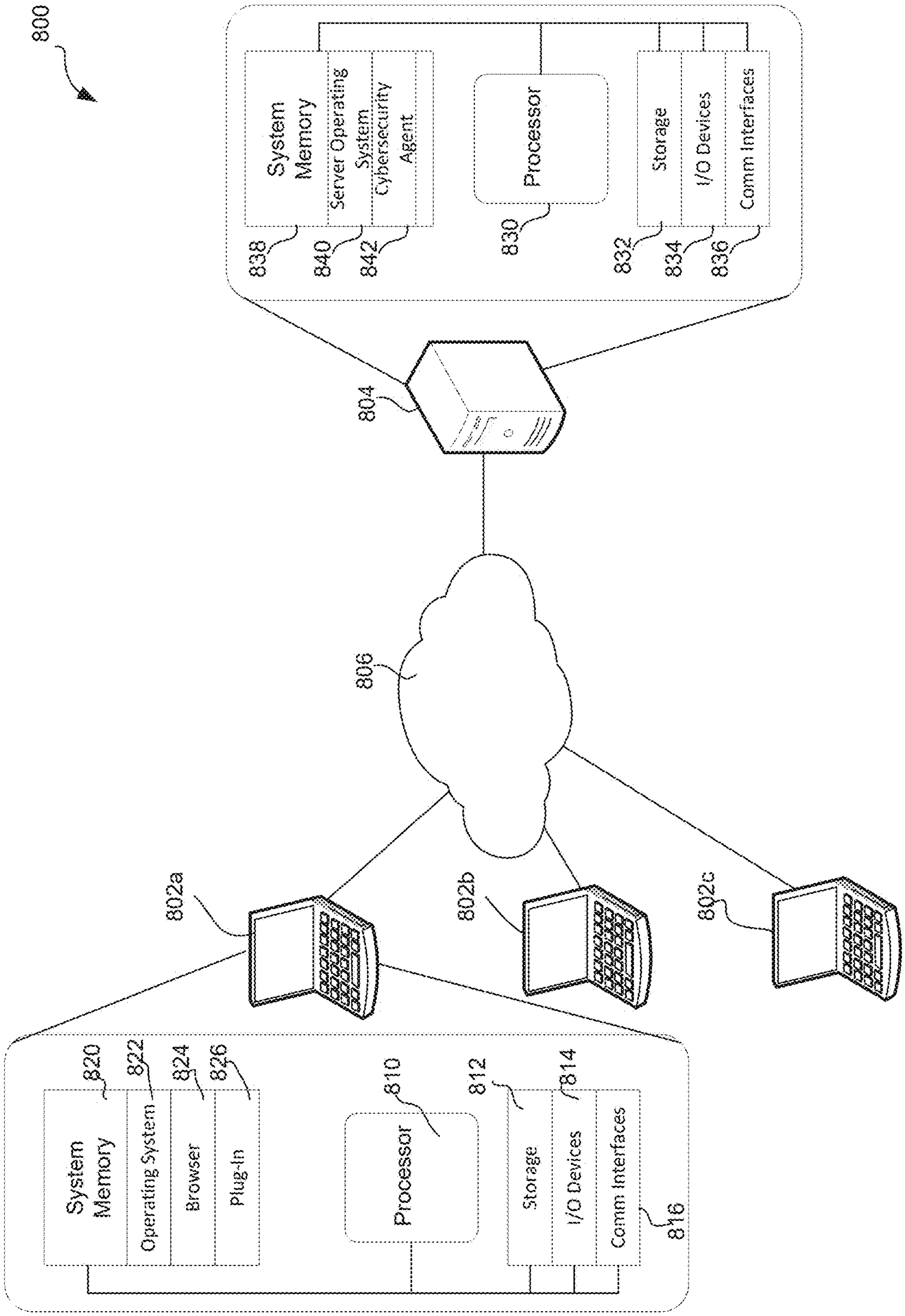
FIG. 8 is a diagrammatic representation of one embodiment of a computer system that includes one embodiment of an anti-phishing system.

FIG. 8 is a diagrammatic representation of one embodiment of a computing environment 800 that includes a plurality of client devices (e.g., client device 802*a*, client device 802*b*, client device 802*c* are illustrated) connected to a server computer system 804 via a network 806. Server computer system 804, according to one embodiment, is a cloud computing system.

Client device 802*a* includes a processor 810 and memory 820. Depending on the exact configuration and type of client device, memory 820 (storing, among other things, executable instructions) may be volatile (such as RAM), non-volatile (such as ROM, flash memory, etc.), or some combination of the two. Further, client device 802*a* may also include storage devices 812, such as, but not limited to, solid state storage. Similarly, client device 802*a* may also have input device(s) and output device (I/O devices 814) such as keyboard, mouse, pen, voice input, touch screen, speakers. Client device 802*a* further includes communications interfaces 816, such as a cellular interface, a Wi-Fi interface, or other interfaces.

Client device 802*a* includes at least some form of non-transitory computer-readable media. The non-transitory computer-readable readable media can be any available media that can be accessed by processor 810 or other devices comprising the operating environment. By way of example, non-transitory computer-readable media may comprise computer storage media such as volatile memory, nonvolatile memory, removable storage, or non-removable storage for storage of information such as computer readable-instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

As stated above, a number of program modules and data files may be stored in system memory 820. While executing on processor 810, program modules (e.g., applications, Input/Output (I/O) management, and other utilities) may perform processes including, but not limited to, one or more of the stages of the operational methods described with respect to client computer 102. In one embodiment, system memory 820 stores an operating system 822, a web browser 824 (e.g., web browser 103) with a browser plug-in 826 (e.g., browser plug-in 104). System memory 820 may include other program modules such as program modules to provide analytics or other services. Furthermore, the program modules may be distributed across computer systems in some embodiments.

Server computer system 804 includes a processor 830 and memory 838. Depending on the exact configuration and type of computer system 804, memory 838 (storing, among other things, executable instructions) may be volatile (such as RAM), non-volatile (such as ROM, flash memory, etc.), or some combination of the two. Further, server computer system 804 may also include storage devices 832. Similarly, server computer system 804 may also have input device(s) and output device (I/O devices 834) such as keyboard, mouse, pen, voice input, touch screen, speakers. Server computer system 804 further includes communications interfaces 836, such as a cellular interface, a Wi-Fi interface, or other interfaces.

Server computer system 804 includes at least some form of non-transitory computer-readable media. The non-transitory computer-readable readable media can be any available media that can be accessed by processor 830 or other devices comprising the operating environment. By way of example, non-transitory computer-readable media may comprise computer storage media such as volatile memory, nonvolatile memory, removable storage, or non-removable storage for storage of information such as computer readable-instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

A number of program modules and data files may be stored in system memory 838. While executing on processor 830, program modules (e.g., applications, Input/Output (I/O) management, and other utilities) may perform processes including, but not limited to, one or more of the stages of the operational methods described with respect to cybersecurity agent 110. In one embodiment, system memory 820 stores a server operating system 840 and cybersecurity agent 842. System memory 838 may include other program modules such as program modules to provide analytics or other services. Furthermore, the program modules may be distributed across computer systems in some embodiments.

Server computer system 804 may be one or more computers operating in a networked environment using logical connections to the client computers. Server computer system 804, in one embodiment, is a cloud computing system. The logical connections may include any method supported by available communications media.

Some embodiments may be practiced in an electrical circuit comprising discrete electronic elements, packaged or integrated electronic chips containing logic gates, a circuit utilizing a microprocessor, or chip single chip containing electronic elements or microprocessors. For example, examples of client device processing or server computer system processing may be practiced via a system-on-a-chip (SOC) where each or many of the components of a client computer or server computer system 804 may be integrated onto a single integrated circuit. Such an SOC device may include processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment on the single integrated circuit (chip).

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

Portions of the methods described herein may be implemented in suitable software code that may reside within RAM, ROM, a hard drive, or other non-transitory storage medium. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods, or programs of embodiments of the invention described herein. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

Particular routines can be executed on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps, and operations described herein can be performed in hardware, software, firmware, or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms “comprises,” “comprising,” “includes,” “including,” “has,” “having,” or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term “or” as used herein is generally intended to mean “and/or” unless otherwise indicated. For example, a condition A or B is satisfied by any one of the following: A is true (or present) and B is false (or not present), A is false (or not present) and B is true (or present), and both A and B are true (or present). As used herein, a term preceded by “a” or “an” (and “the” when antecedent basis is “a” or “an”) includes both singular and plural of such term, unless clearly indicated otherwise (i.e., that the reference “a” or “an” clearly indicates only the singular or only the plural). Also, as used in the description herein and throughout the meaning of “in” includes “in” and “on” unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: “for example,” “for instance,” “e.g.,” “in one embodiment.”

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features, and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A computer-implemented method for preventing phishing, the method comprising:

receiving a request to classify a webpage requested by a web browser, the request to classify the webpage comprising details of the webpage;

classifying the webpage using the details of the webpage, wherein classifying the webpage comprises:

accessing an instruction definition from a memory, the instruction definition specifying anti-phishing questions for phishing detection and an answer format for the anti-phishing questions, wherein the instruction definition associates the anti-phishing questions specified in the instruction definition with contexts selected from the details of the webpage;

generating, according to the instruction definition, a programmatic instruction to a large language model to prompt the large language model to answer the anti-phishing questions using the details of the webpage, the programmatic instruction comprising the anti-phishing questions, the answer format, and the details of the webpage, wherein the programmatic instruction specifies which context is to be used for answering each of the anti-phishing questions specified in the instruction definition;

receiving a result of processing the programmatic instruction from the large language model, the result comprising a plurality of answers, the plurality of answers comprising answers to the anti-phishing questions; and determining a phishing classification from a plurality of potential classifications based on the result; and returning a response to the request to classify the webpage, the response including the phishing classification.

2. The computer-implemented method of claim 1, wherein the response is returned prior to the web browser rendering the webpage.

3. The computer-implemented method of claim 2, further comprising displaying a message to a user of the web browser, the message indicating the phishing classification.

4. The computer-implemented method of claim 3, wherein the response includes a reason for the phishing classification and wherein the message includes the reason.

5. The computer-implemented method of claim 1, further comprising executing a defined action based on the phishing classification.

6. The computer-implemented method of claim 5, wherein the defined action comprises blocking the web browser from rendering the webpage.

7. The computer-implemented method of claim 1, wherein the details of the webpage comprise a uniform resource locator of the webpage and content text of the webpage.

8. The computer-implemented method of claim 1, further comprising:

generating an initial result using the large language model, the initial result comprising the answers to the anti-phishing questions; and enhancing the initial result using a search result for a search query that incorporates the answer to at least one of the anti-phishing questions to generate an enhanced result, wherein the phishing classification is determined based on the enhanced result.

9. The computer-implemented method of claim 1, wherein determining the phishing classification based on the result comprises scoring the result to generate a score, wherein the phishing classification is selected based on the score.

10. An anti-phishing system comprising:

a client computer comprising a web browser with a browser plug-in, the browser plug-in comprising instructions executable for:

capturing details of a webpage requested by the web browser;

generating a request to classify the webpage, the request to classify the webpage comprising the details of the webpage;

receiving a response to the request to classify the webpage, the response comprising a phishing classification for the webpage;

executing a predefined action based on the response;

a server computer in communication with the client computer over a network, the server computer comprising a cybersecurity agent, the cybersecurity agent comprising a large language model and instructions executable for:

maintaining an anti-phishing knowledgebase;

classifying the webpage using the details of the webpage, wherein classifying the webpage comprises: accessing an instruction definition, the instruction definition specifying anti-phishing questions for phishing detection from the anti-phishing knowledgebase and an answer format for the anti-phishing questions, wherein the instruction definition associates the anti-phishing questions specified in the instruction definition with contexts selected from the details of the webpage;

generating, according to the instruction definition, a programmatic instruction to the large language model to prompt the large language model to answer the anti-phishing questions using the details of the webpage, the programmatic instruction comprising the anti-phishing questions specified by the instruction definition, the answer format, and the details of the webpage, wherein the programmatic instruction specifies which context is to be used for answering each of the anti-phishing questions specified in the instruction definition;

receiving a result of processing the programmatic instruction from the large language model, the result comprising a plurality of answers, the plurality of answers comprising answers to the anti-phishing questions included in the programmatic instruction to the large language model; and determining the phishing classification based on the result; and returning the response to the request to classify the webpage to the browser plug-in, the response including the phishing classification.

11. The anti-phishing system of claim 10, wherein the response is returned prior to the web browser rendering the webpage.

12. The anti-phishing system of claim 11, wherein the predefined action comprises at least one of:

displaying a message to a user of the web browser, the message indicating the phishing classification; or blocking the web browser from rendering the webpage.

13. The anti-phishing system of claim 11, wherein the large language model further comprises a search engine and wherein the large language model is executable to:

generate an initial result using the large language model, the initial result comprising the answers to the anti-phishing questions;

generate a search query to the search engine that incorporates the answer to at least one of the anti-phishing questions;

receive a search result from the search engine responsive to the search query; and enhance the initial result using the search result to generate an enhanced result, wherein the phishing classification is determined based on the enhanced result.

14. The anti-phishing system of claim 10, wherein the details of the webpage comprise a uniform resource locator of the webpage and text content of the webpage.

15. A computer program product comprising a non-transitory, computer-readable medium storing thereon anti-phishing software, the anti-phishing software comprising instructions translatable by a processor for:

receiving a request to classify a webpage, the request to classify the webpage comprising details of the webpage;

classifying the webpage using the details of the webpage, wherein classifying the webpage comprises:

accessing an instruction definition from a memory, the instruction definition specifying anti-phishing questions for phishing detection and an answer format for the anti-phishing questions wherein the instruction definition associates the anti-phishing questions specified in the instruction definition with contexts selected from the details of the webpage;

generating, according to the instruction definition, a programmatic instruction to a large language model to prompt the large language model to answer the anti-phishing questions using the details of the webpage, the programmatic instruction comprising the anti-phishing questions, the answer format, and the details of the webpage, wherein the programmatic instruction specifies which context is to be used for answering each of the anti-phishing questions specified in the instruction definition;

receiving a result of processing the programmatic instruction from the large language model, the result comprising a plurality of answers, the plurality of answers comprising answers to the anti-phishing questions; and determining a phishing classification from a plurality of potential classifications based on the result; and returning a response to the request to classify the webpage, the response including the phishing classification.

16. The computer program product of claim 15, wherein the webpage was requested by a web browser of a client computer and the response is returned prior to the web browser rendering the webpage.

17. The computer program product of claim 16, wherein the response comprises a reason for the phishing classification.

18. The computer program product of claim 15, wherein classifying the webpage further comprises:

generating an initial result using the large language model, the initial result comprising the answers to the anti-phishing questions;

generating a search query to a search engine that incorporates the answer to at least one of the anti-phishing questions;

receiving a search result from the search engine responsive to the search query; and enhancing the initial result using the search result to generate an enhanced result, wherein the phishing classification is determined based on the enhanced result.

19. The computer program product of claim 15, wherein the details of the webpage comprise a uniform resource locator of the webpage and text content of the webpage.

* * * * *